United States Patent
Kim et al.

(10) Patent No.: US 7,617,381 B2
(45) Date of Patent: Nov. 10, 2009

(54) DEMAND PAGING APPARATUS AND METHOD FOR EMBEDDED SYSTEM

(76) Inventors: Hyo-jun Kim, c/o Samsung Electronics Co., Ltd., 416, Maetan-dong, Yeongtong-gu, Suwon-si, Gyeonggi-do (KR); Ji-hyun In, c/o Samsung Electronics Co., Ltd., 416, Maetan-dong, Yeongtong-gu, Suwon-si, Gyeonggi-do (KR); Dong-hoon Ham, c/o Samsung Electronics Co., Ltd., 416, Maetan-dong, Yeongtong-gu, Suwon-si, Gyeonggi-do (KR)

( * ) Notice: Subject to any disclaimer, the term of this patent is extended or adjusted under 35 U.S.C. 154(b) by 372 days.

(21) Appl. No.: 11/603,160

(22) Filed: Nov. 22, 2006

(65) Prior Publication Data

US 2007/0150695 A1 Jun. 28, 2007

(30) Foreign Application Priority Data

Dec. 27, 2005 (KR) ...................... 10-2005-0130804

(51) Int. Cl.
*G06F 12/06* (2006.01)
(52) U.S. Cl. ...................... 711/209; 711/206
(58) Field of Classification Search .................. None
See application file for complete search history.

(56) References Cited

U.S. PATENT DOCUMENTS

| | | | |
|---|---|---|---|
| 5,095,420 A * | 3/1992 | Eilert et al. | 711/209 |
| 6,349,375 B1 * | 2/2002 | Faulkner et al. | 711/173 |
| 7,457,909 B2 * | 11/2008 | Di Sena et al. | 711/103 |
| 2002/0116651 A1 | 8/2002 | Beckert et al. | |
| 2004/0160449 A1 | 8/2004 | Gossalia et al. | |
| 2005/0086450 A1 | 4/2005 | Shiota | |
| 2005/0268092 A1 * | 12/2005 | Shankar et al. | 713/164 |

FOREIGN PATENT DOCUMENTS

| | | |
|---|---|---|
| EP | 0229691 A2 | 7/1987 |
| EP | 0 370 178 B1 | 5/1990 |
| EP | 0370178 B1 | 11/1995 |
| JP | 2000-235414 A | 8/2000 |
| JP | 2005-353055 A | 12/2005 |
| KR | 1996-7001404 A | 2/1996 |
| KR | 10-2004-0102826 A | 12/2004 |
| KR | 10-2005-0075533 A | 7/2005 |
| WO | WO 94/18625 A1 | 8/1994 |

* cited by examiner

*Primary Examiner*—Than Nguyen
(74) *Attorney, Agent, or Firm*—Sughrue Mion, PLLC

(57) ABSTRACT

A demand paging apparatus and a method for an embedded system are provided. The demand paging apparatus includes a nonvolatile storage device, a physical memory, a demand paging window, and a demand paging manager. The nonvolatile storage device stores code and data which are handled by demand paging. The physical memory processes information about a requested page that is read from the nonvolatile storage device. The demand paging window generates a fault for the page and, thus, causes demand paging to occur. The demand paging window is part of an address space to which an application program stored in the nonvolatile storage device refers. The demand paging manager processes the page fault generated in the demand paging window.

20 Claims, 7 Drawing Sheets

DEMAND PAGING APPARATUS AND METHOD FOR EMBEDDED SYSTEM

CROSS-REFERENCE TO RELATED APPLICATION

This application claims priority from Korean Patent Application No. 10-2005-130804 filed on Dec. 27, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to demand paging for an embedded system and, more particularly, to a demand paging apparatus and method for an embedded system that enable a demand paging technique to be simply and efficiently used when the demand paging technique is applied, either to a system in which an operating system supporting demand paging is used, or to a system in which an operating system is not used.

2. Related Art

The term "demand paging" refers to a technique in which, in an operating system using a virtual memory system, virtual memory is allocated to an auxiliary storage device such as a hard disk, and physical memory is mapped thereto at the request of a user, thereby enabling limited main memory to be used more efficiently. Although demand paging is used in general-purpose operating systems such as Linux and Windows, in response to increasing size of code and data required by application programs, such a function is not supported in most embedded systems due to its complicated mechanism. The reason for this is because each memory system itself is closely associated with the operation of a general-purpose operating system. That is, unless operating system supporting demand paging is used, it is difficult to implement demand paging in practice.

Figure 1A:
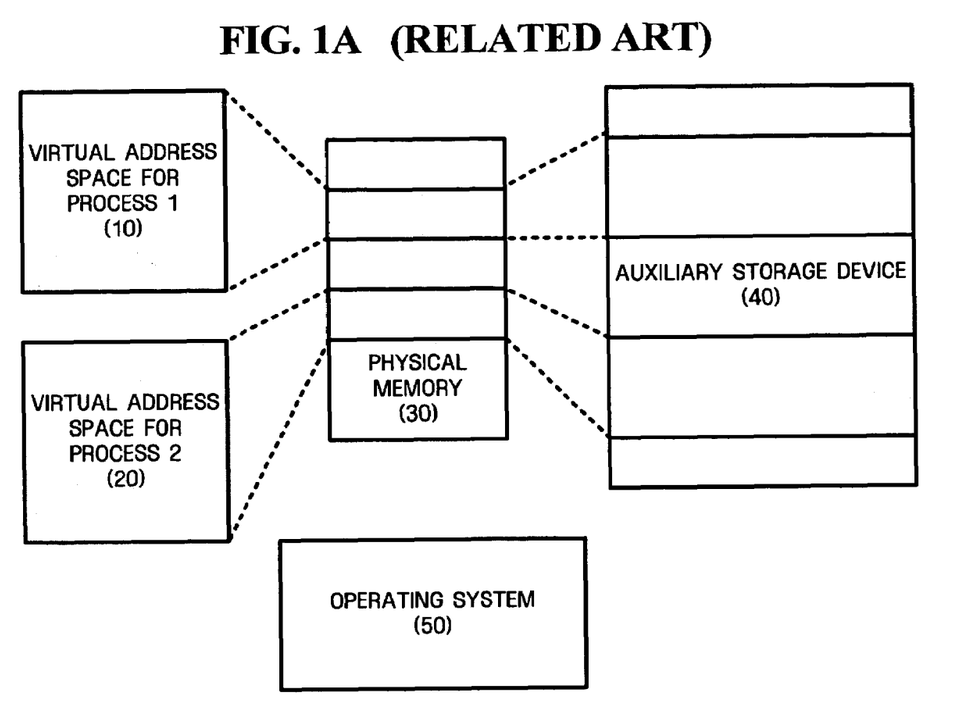
FIG. 1A is a diagram illustrating a related art demand paging apparatus in an operating system that supports demand paging.

FIG. 1A is a diagram illustrating a related art demand paging apparatus in an operating system that supports demand paging, including physical memory 30 having a limited size, an auxiliary storage device 40 for generating virtual memory spaces for the demand paging, virtual address spaces 10 and 20 of respective processes for functioning as application programs, and an operating system 50 for managing the demand paging. When processes are generated, the operating system 50 generates virtual memory spaces for the respective processes in the auxiliary storage device 40. Thereafter, when the processes attempt to access the virtual memory spaces, the operating system 50 allocates appropriate spaces to the physical memory 30, reads the content of the virtual memory spaces from the auxiliary storage device 40, and then maps the content to the virtual address spaces 10 and 20 of the respective processes, thereby executing an application program.

In this case, the virtual address spaces 10 and 20 of the respective processes are classified into a kernel region and a user region. In the kernel region, a space having the same size as the space into which the code and static data of the operating system 50 are loaded is secured in the physical memory 30. The demand paging technique is applied to all of the remaining space. Therefore, all of the code and data are handled by the demand paging technique from the point of view of a user program.

Figure 1B:
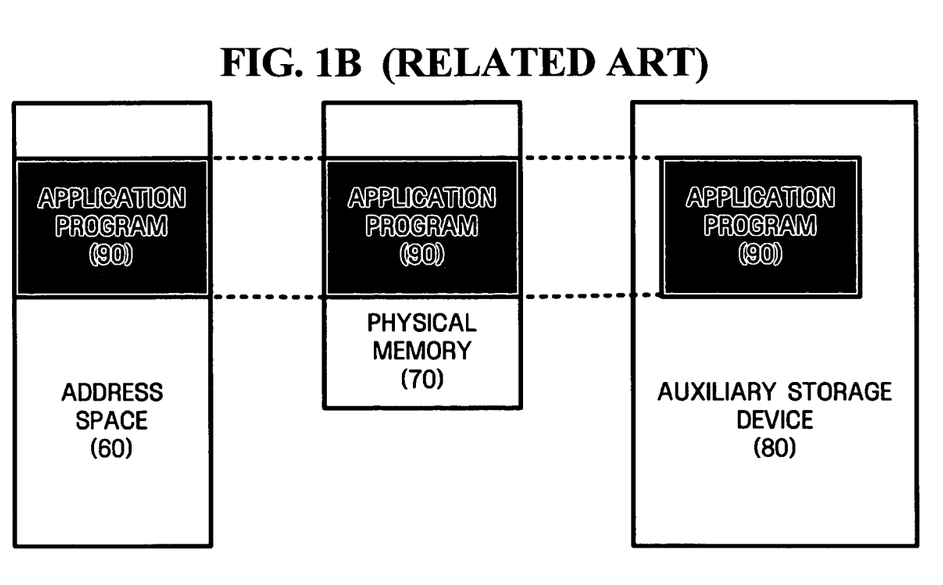
FIG. 1B is a diagram illustrating a related art system that does not use demand paging.

FIG. 1B is a diagram illustrating a related art system that uses demand paging, including an address space 60 that is viewed and used by an application program 90, physical memory 70 existing in a system and having a limited size, an auxiliary storage device 80 for storing the application program, and the application program 90 stored in the auxiliary storage device 80, loaded into the physical memory 70, and then mapped to the address space 60.

In the system, the entire memory space is shared without being divided into regions corresponding to processes. Since the physical memory 70 may be mapped to the address space 60 unchanged, a program that has a size larger than that of the physical memory 70 of the system may not be executed. In general, the application program 90 stored in the auxiliary storage device 80 is loaded into the physical memory 70 through a boot loader and then executed.

To apply demand paging in the related art case of FIG. 1A, using a scheme of supporting the demand paging at the operating system level, there is a problem in that the operating system itself must be replaced with another operating system. Furthermore, since most operating systems for embedded systems do not support virtual address spaces for respective tasks, it is difficult to introduce the conventional demand paging scheme thereto. Alternatively, if an operating system supporting demand paging is used, it is difficult to predict the portion of an application program for which the processing will be delayed by demand paging and the moment at which the portion of an application program will be delayed by demand paging from the point of view of the application program. Therefore, there is a problem in that it is difficult to apply the system to applications that require real-time responses.

Furthermore, in the related art system of FIG. 1B, which does not use demand paging, there is a problem in that it is difficult to handle the gradually increasing size of code and data. Furthermore, when a program stored in the storage device is executed in the case where NAND flash memory, that is, nonvolatile memory that cannot be directly addressed or a hard disk, is employed in the system, there is a problem in that RAM having a size corresponding to the size of the program must be allocated.

SUMMARY OF THE INVENTION

The present invention provides a demand paging apparatus and method for embedded systems, in which a demand paging technique can be used both in a system using an operating system that supports demand paging and in a system using an operating system that does not support demand paging.

According to an aspect of the present invention, there is provided a demand paging apparatus for an embedded system, the apparatus including a nonvolatile storage device storing code and data which are handled by demand paging; physical memory processing information about a requested page that is read from the nonvolatile storage device; a demand paging window generating a fault for the page and, thus, causing demand paging to occur, the demand paging window being part of an address space to which an application program stored in the nonvolatile storage device refers; and a demand paging manager processing the page fault generated in the demand paging window.

The demand paging manager may be allocated part of the physical memory and generate a demand paging memory pool for performing the demand paging.

The demand paging memory pool may include a frame buffer being mapped to a virtual memory space in the demand paging window; a memory conversion table informing a Memory Management Unit (MMU) of information about the mapping; and a frame buffer list, that is, a data structure for managing the frame buffer.

The demand paging manager may include an interface module, initializing the demand paging manager and activating the memory management unit; a page cache management module initializing the frame buffer and the frame buffer list in response to a request from the interface module; a page fault processing module determining whether the page fault generated by the activated memory management unit was generated in a region of the demand paging window, thereby processing the page fault.

The interface module may include an Application Program Interface (API) receiving a request from the application program for generation of the demand paging window, along with information; a memory conversion table generation unit being allocated memory from the demand paging memory pool and generating the memory conversion table for the region of the demand paging window; a page fault handler installation unit registering the page fault processing module in a Central Processing Unit (CPU); and a memory management unit control unit controlling the memory management unit for calling the registered page fault processing module. In this case, the information may include information about the size and address of a space occupied by the demand paging window, information about the size of the demand paging memory pool, and information about the locations of the code and data stored in the nonvolatile storage device.

The nonvolatile storage device may be NAND flash memory.

According to another aspect of the present invention, there is provided a demand paging method for an embedded system, the method including generating a demand paging window in response to a request from an application program stored in a nonvolatile storage device, the demand paging window being a region in which demand paging occurs; initializing a demand paging manager for processing a page fault generated in the demand paging window, thereby activating a memory management unit; when the page fault has been generated in the demand paging window, calling a page fault processing module registered with a CPU using the activated memory management unit; determining whether the page fault has been generated in the demand paging window using the called page fault processing module; and if the page fault has been generated in the demand paging window, processing the page fault at the page fault processing module.

The initializing the demand paging manager may include receiving a request from the application program for generation of the demand page window, along with information; being allocated memory by an operating system and generating a memory conversion table for the region of the demand paging window; registering a page fault processing module, which is executed when a page fault interrupt is generated, with the CPU; and activating a memory management unit for calling the registered page fault processing module. In this case, the information may include information about the size and address of a space occupied by the demand paging window, information about the size of memory requested to execute the demand paging, and information about the locations of code and data stored in the nonvolatile storage device.

The processing the page fault may include if the page fault was generated in the demand paging window, the demand paging manager being allocated a frame buffer within a demand paging memory pool; the page fault processing module reading a page from the nonvolatile storage device using the frame buffer; and modifying the memory conversion table according to the read page.

BRIEF DESCRIPTION OF THE DRAWINGS

The above and other aspects of the present invention will be more clearly understood from the following detailed description of exemplary embodiments taken in conjunction with the accompanying drawings, in which.

DESCRIPTION OF THE EXEMPLARY EMBODIMENTS

Aspects of the invention will become more apparent from the following detailed description of exemplary embodiments taken in conjunction with the accompanying drawings. However the present invention is not limited to the exemplary embodiments, but may be implemented in various manners. The exemplary embodiments are provided to complete the disclosure and to allow those having ordinary skill in the art to understand the scope of the present invention. The same reference numbers will be used throughout the drawings to refer to the same or like parts.

A demand paging apparatus and method for embedded systems will be described in detail with reference to the block diagrams or the flowcharts below.

Figure 2:
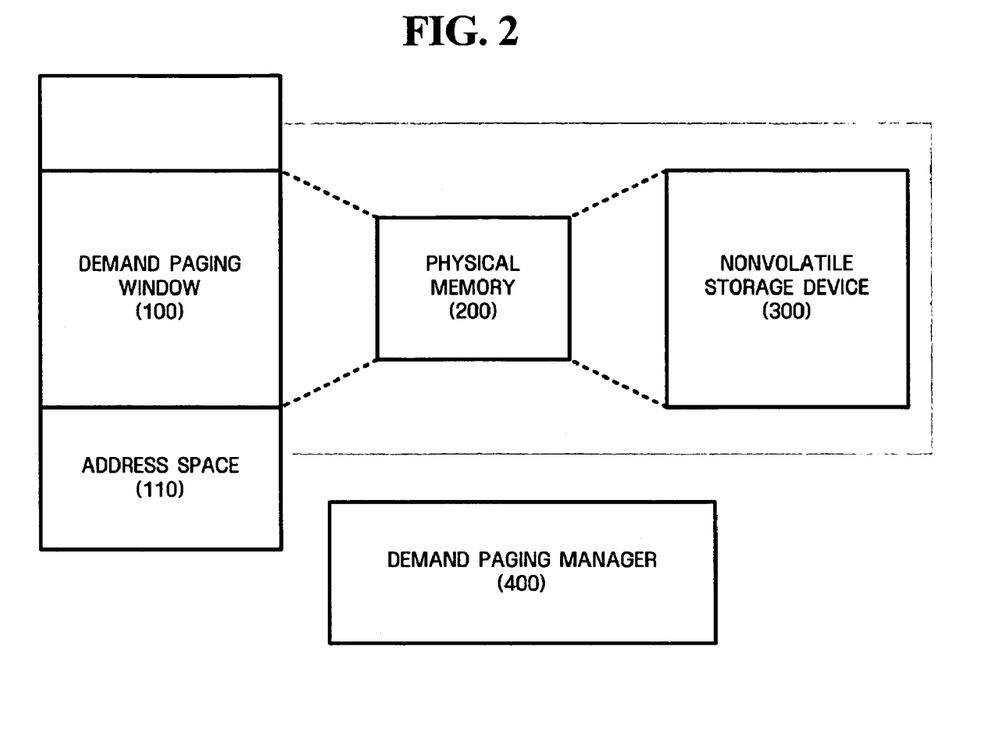
FIG. 2 is a block diagram illustrating the concept of a demand paging apparatus for embedded systems according to an exemplary embodiment of the present invention.

FIG. 2 is a block diagram illustrating the concept of a demand paging apparatus for embedded systems according to an exemplary embodiment of the present invention. The demand paging apparatus for embedded systems includes a demand paging window 100 within an address space 110, physical memory 200, a nonvolatile storage device 300, and a demand paging manager 400.

The nonvolatile storage device 300 is a space for storing code and data that are subject to demand paging and maintains information stored therein even if power is cut off, such that the stored information may be reused when the supply of power is resumed, and refers to flash memory, Read-Only Memory (ROM), a magnetic tape, or a magnetic disk.

More specifically, the flash memory is freely able to store and delete data and is classified as NOR flash memory or NAND flash memory according to the internal configuration thereof. The NOR flash memory has a configuration in which the cells thereof are coupled in parallel to each other, while the NAND flash memory has a configuration in which the cells thereof are coupled in series to each other. The NAND flash memory may have a lower manufacturing cost and may be able to realize higher capacity than the NOR flash memory, while the NOR flash memory may have a shorter data access time and better data stability than the NAND flash memory. However, the exemplary embodiments do not require these aspects, and may be envisioned without these aspects as well.

In the exemplary embodiment, NAND flash memory may be used as the nonvolatile storage device 300 to achieve the advantage of allowing the application program of the embedded system to directly control the function of demand paging.

The physical memory 200 is a storage type in which information about a requested page read from the nonvolatile storage device 300 is processed. RAM is generally used as the physical memory 200.

The demand paging window 100 is part of the address space 110 which the application program stored in the nonvolatile storage device 300 views and refers to. The demand paging window 100 is a region in which a page fault for the read page is generated, thereby causing demand paging to occur. The demand paging window 100 may be generated by a user program regardless of the operating system. For this purpose, the demand paging manager 400 is initialized at the application program level, and the demand paging window 100 is registered therein. Since such a registration process may be repeated many times, a plurality of demand paging windows 100 may be simultaneously used. After the registration of the demand paging window 100 is completed, the demand paging manager 400 is requested to activate the demand paging window 100, consequently the demand paging window 100 is activated.

The demand paging manager 400 functions to process the page fault generated from the demand paging window 100. The construction of the demand paging manager 400 is shown in detail in FIG. 3, which is a view showing the construction of the demand paging manager 400 and a demand paging memory pool 200A, which is part of the construction of the demand paging apparatus. The demand paging manager 400 is allocated to part of the memory from the physical memory 200 and generates the demand paging memory pool 200A for performing the demand paging.

Figure 3:
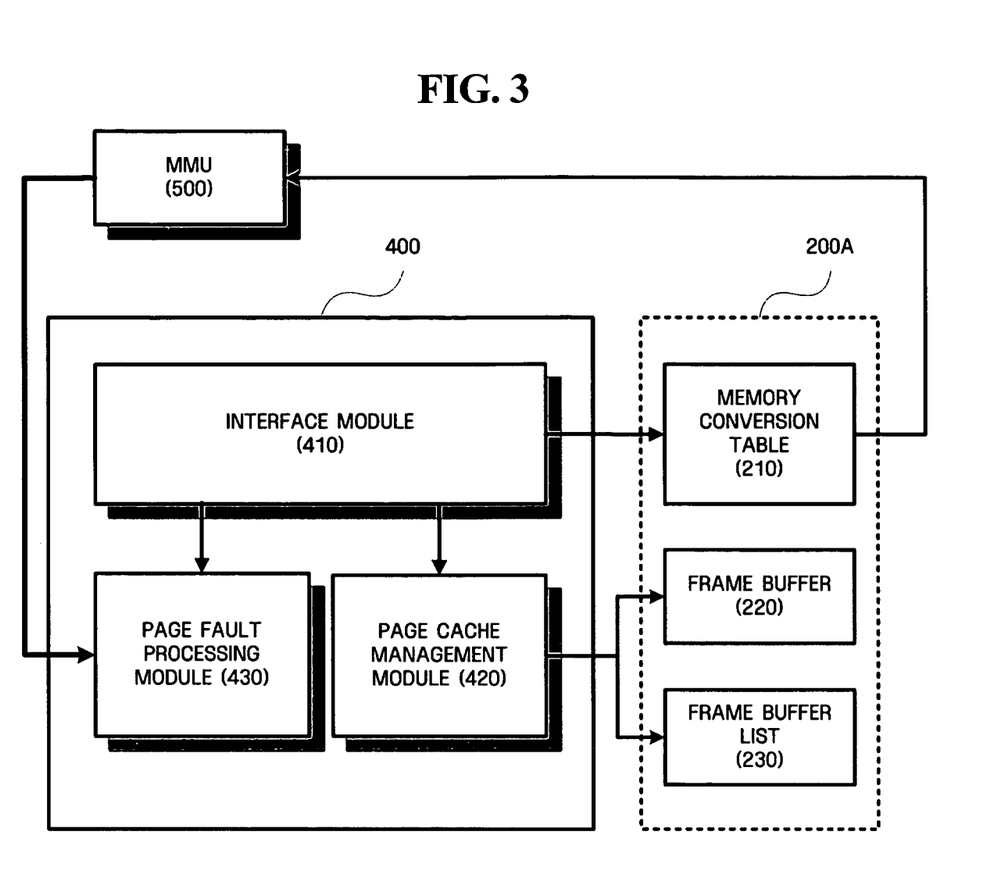
FIG. 3 is a view showing the construction of a demand paging manager and a physical memory that is part of the construction of the demand paging apparatus, according to the exemplary embodiment of the present invention.

The demand paging memory pool 200A includes a frame buffer 220, which is formed of the physical memory mapped to the virtual memory space within the demand paging window 100, a memory conversion table 210, which informs the Memory Management Unit (MMU) 500 of information about the mapping, and a frame buffer list 230, which is a data structure for managing the frame buffer 220. Furthermore, the demand paging manager 400 includes an interface module 410, a page cache management module 420, and a page fault processing module 430.

The demand paging window 100 must be generated by an application program independent of the operating system. In order to process a page fault using the demand paging apparatus, the demand paging manager 400 must be initialized. The interface module 410 performs related functions, thus activating the memory management unit.

The page cache management module 420 functions to initialize the frame buffer 220 and the frame buffer list 230 at the request of the interface module 410. As a result, the frame buffer 220 and the frame buffer list 230 are generated.

The page fault processing module 430 is a kind of page fault handler which is called by the activated memory management unit. When a page fault interrupt is generated, the page fault processing module 430 functions to determine whether the interrupt has been generated in the region of the demand paging window 100 and to process the page fault.

The interface module 410 may be responsible for the initialization process, which is executed for the apparatus of the exemplary embodiment to perform a demand paging function, as described with reference to FIG. 4.

Figure 4:
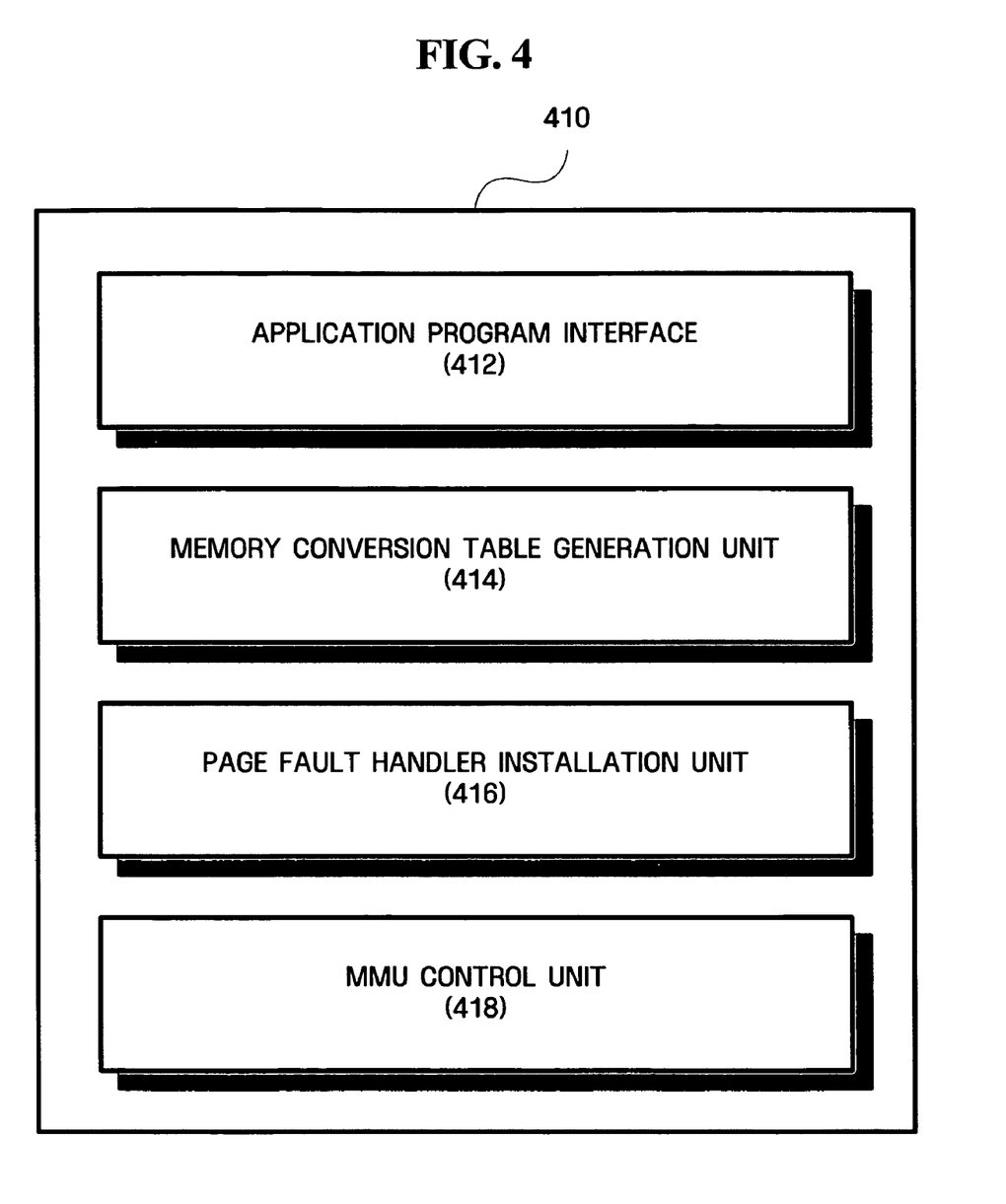
FIG. 4 is a view showing the construction of an interface module that is part of the construction of the demand paging apparatus, according to the exemplary embodiment of the present invention.

FIG. 4 is a view showing the construction of the interface module 410, which is part of the construction of the demand paging manager. An Application Program Interface (API) 412 performs the function of receiving the request of an application program for the generation of the demand paging window 100, along with information. In this case, the information includes information about the size and address of the demand paging window 100, information about the size of the demand paging memory pool 200A, and information about the locations of the code and data stored in the nonvolatile storage device 300.

A memory conversion table generation unit 414 functions to allocate memory from the demand paging memory pool 200A and generate the memory conversion table 210 for the region of the demand paging window 100. In this case, operation varies depending on whether the memory management unit 500 has been activated.

If the memory management unit 500 has been inactivated, the demand paging manager 400 must newly update the memory conversion table 210 for the entire address space, and register the memory conversion table 210 with the Central Processing Unit (CPU). The reason for this is because the memory conversion table 210 is always necessary for activation of the memory management unit 500. However, if the memory management unit 500 has already been activated, this means that the memory conversion table 210 registered with the system already exists for the entire address space, therefore the demand paging manager 400 does not need to newly update the entire table. Regardless of whether the memory management unit 500 was activated, there exists a memory conversion table 210 for the entire address space after the above process has been completed.

Now, it is necessary to modify the memory conversion table 210 for the region of the demand paging window 100 so as to generate a page fault interrupt. If a specific value that can be recognized by the CPU is entered into the memory conversion table 210, a page fault interrupt is generated when data is read from or written in the corresponding memory. That is, this process is a process of initializing the memory conversion table 210 to generate a page fault interrupt in the region of the demand paging window 100.

A page fault handler installation unit 416 functions to register the page fault processing module 430 with the CPU. If a page fault interrupt is generated, the memory management unit calls a specific routine, which is called a page fault handler and registered with the CPU. Since the page fault processing module 430 performs a function corresponding to the page fault handler, the page fault processing module 430 must have already been registered with the CPU. An MMU control unit 418 functions to control the memory management unit 500, which calls the registered page fault processing module 430.

The term "unit" used in the exemplary embodiment, such as "module" and "table", refers to software and hardware constituent elements, such as a Field Programmable Gate Array (FPGA) or an Application Specific Integrated Circuit (ASIC). The module performs functions. However, this does not mean that the module is limited to software or hardware. The module may be configured to exist in a storage medium which is addressable and may be configured to execute on one or more processing units. For example, the module may include constituent elements, such as software constituent elements, object-oriented software constituent elements, class constituent elements and task constituent elements, processes, functions, attributes, procedures, subroutines, segments of program code, drivers, firmware, microcodes, circuits, data, databases, data structures, tables, arrays, and parameters. Functions provided within the constituent elements and the modules may be combined with a smaller number of constituent elements and modules or may be separated into additional constituent elements and modules. Furthermore, the constituent elements and the modules may be implemented to execute on one or more CPUs within a device.

Figure 5:
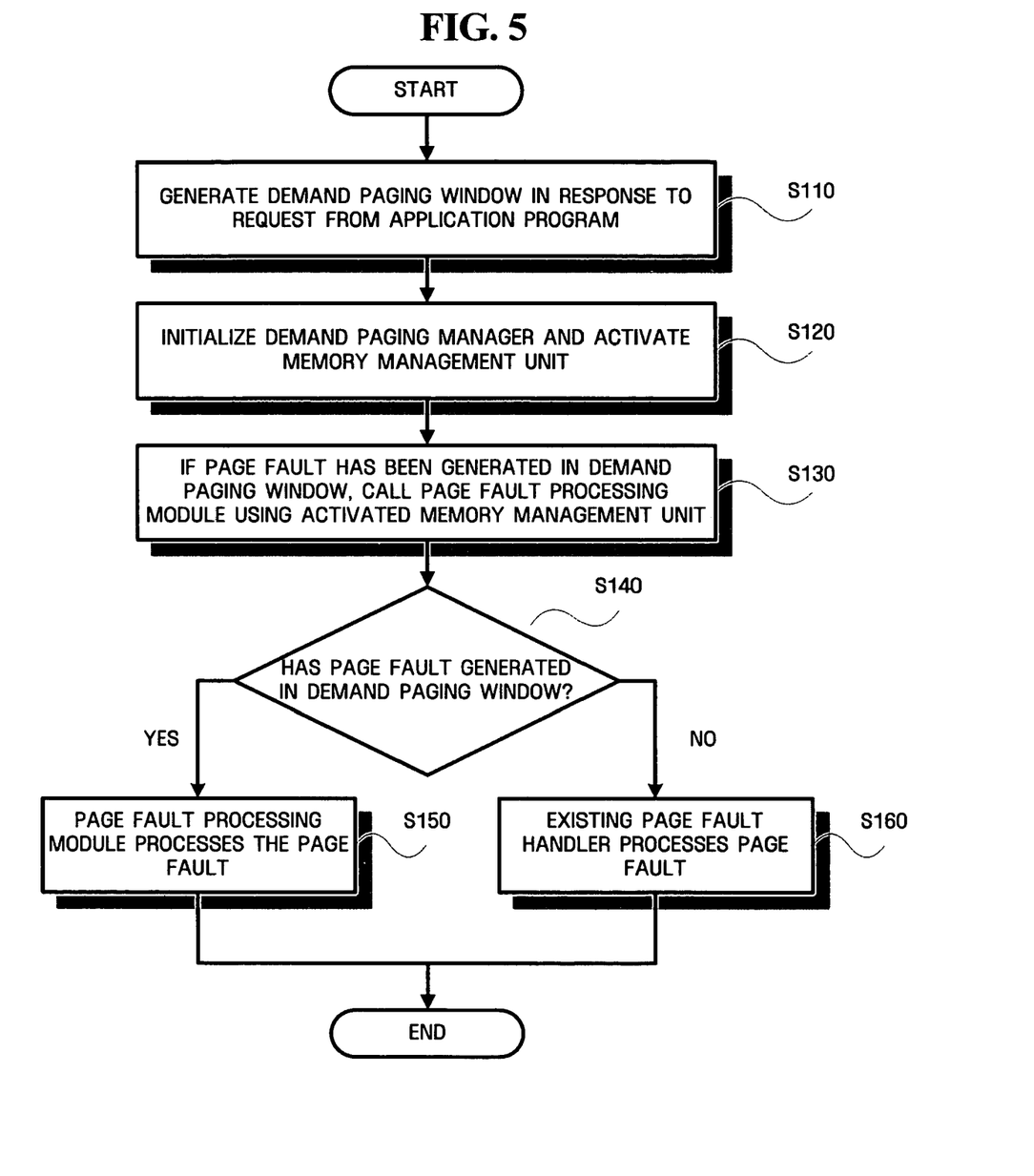
FIG. 5 is a flowchart illustrating the concept of a demand paging method for an embedded system according to an exemplary embodiment of the present invention.
Figure 6:
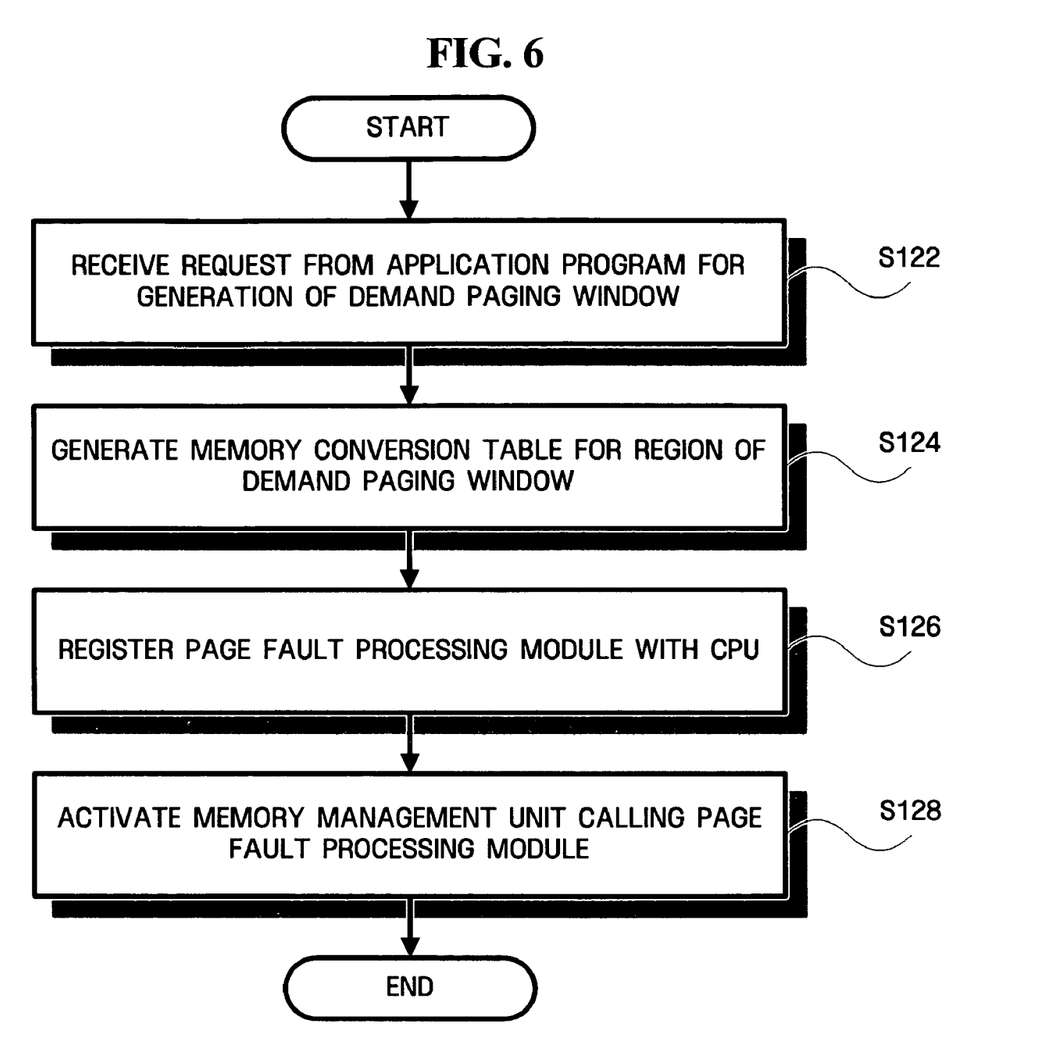
FIG. 6 is a flowchart illustrating a process of initializing the demand paging manager according to the exemplary embodiment.

The process of executing a demand paging method according to an exemplary embodiment of the present invention will be described with reference to FIGS. 5 and 6 below. FIG. 5 is a flowchart showing the concept of the demand paging method for the embedded system according to the exemplary embodiment of the present invention, and FIG. 6 is a flowchart showing a process of initializing the demand paging manager.

First, at the request of the application program stored in the nonvolatile storage device 300, the demand paging window 100, that is, the region in which demand paging is generated, is generated at operation S110. Thereafter, the demand paging manager 400 for processing a page fault generated from the demand paging window 100 is initialized, thereby activating the memory management unit 500 at operation S120.

The above initialization process will be described in detail with reference to FIG. 6. First, an application program used by a user requests the demand paging manager 400 to generate the demand paging window 100 in the virtual address space 110 at operation S122. In this case, the application program hands information over to the demand paging manager 400. That is, information about the size and address of the virtual address space 110 that are occupied by the demand paging window 100, information about the size of the demand paging memory pool 200A which is required to execute the demand paging, and information about the locations of the code and data which are stored in the nonvolatile storage device 300 are handed over.

When the demand paging window 100 is generated, memory is allocated by the operating system, and the memory conversion table for the region of the demand paging window 100 is generated at operation S124. The page fault processing module 430, which is a handler for processing a page fault interrupt when the page fault interrupt is generated, is registered with the CPU at operation S126, and then the memory management unit 500 for calling the registered page fault processing module 430 is activated at operation S128, thereby completing the initialization.

Meanwhile, when a page fault is generated in the demand paging window 100 after the initialization process has been completed, the page fault processing module 430, which is the page fault handler registered with the CPU, is called using the activated memory management unit 500 at operation S130.

The called page fault processing module 430 determines whether a page fault has been generated in the demand paging window 100 at operation S140. If the page fault has been generated in the demand paging window 100, the page fault processing module 430 performs the operation of processing the page fault at operation S150. If the page fault has been generated not in the demand paging window 100 but in another region, the page fault is processed using the existing registered page fault handler at operation S160.

Operation S150 is described in greater detail below. If the page fault has been generated in the demand paging window 100, the demand paging manager 400 is allocated the frame buffer 220 within the demand paging memory pool 200A, and the page fault processing module 430 reads a page from the nonvolatile storage device 300 using the allocated frame buffer 220. The memory conversion table is modified according to the read page. The nonvolatile storage device 300, described above in detail, may be NAND flash memory.

A related art operating system manages the entire space for a process using the demand paging technique, whereas the demand paging window suggested in the exemplary embodiment allocates part of the physical memory space used by the application program, therefore the demand paging technique can be employed. Space other than the region of the demand paging window may be used as in a related art physical memory system. For the part of the memory set for the region of the demand paging window, access to the code and data stored in a large size nonvolatile storage device can be made using limited size physical memory. Since the application program plays a leading role of setting only part of the entire memory space of the application program for the demand paging window, code can be easily classified as code which will be executed in the demand paging window or code for which a fast response time must be guaranteed. Accordingly, the present demand paging technique may be also used in an application program using a related art real-time operating system.

Meanwhile, it will be apparent to those skilled in the art that the scope of the present invention includes a computer-readable recording medium storing program code for executing the above-described demand paging method for an embedded system on a computer.

According to the demand paging apparatus and method for an embedded system of the exemplary embodiment(s), there may exist an advantage in that the demand paging technique may easily be used in systems in which an operating system that does not support the demand paging is used and in systems lacking an operating system. Furthermore, according to the exemplary embodiment, the demand paging manager may be provided in a component form. Therefore the demand paging function can be controlled freely and directly not at the operating system level but at the application program level. Accordingly, since the extent of use of main memory by the system can be reduced, the manufacturing cost of related products may be reduced. However, the foregoing advantages are not required in order to practice the invention, and the invention may be practiced without the foregoing advantages in a manner that does not depart from the scope of the invention.

The effects of the exemplary embodiments are not limited to the above-described effects, and the other effects that are not described above may be clearly understood by those skilled in the art from the accompanying claims.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A demand paging apparatus for an embedded system, comprising:
   a nonvolatile storage device which stores code and data to be handled by demand paging;

a physical memory which stores information about a requested page, the information being read from the nonvolatile storage device, the physical memory comprising:
  a demand paging window that is accessed by an application program stored in the nonvolatile storage device, and if the demand paging window is accessed by the application program to generate a page fault for the requested page causes demand paging to occur, the demand paging window being an address space that is a portion of an entire address space of the physical memory allocated to the application program that the application program requests to be allocated for demand paging, the portion being less than the entire address space; and
  a demand paging manager which processes the generated page fault if the demand paging window is accessed by the application program to generate a page fault.

2. The demand paging apparatus of claim 1, wherein the demand paging manager is allocated a part of the physical memory and generates a demand paging memory pool which performs the demand paging.

3. The demand paging apparatus of claim 2, wherein the demand paging memory pool comprises:
  a frame buffer which is mapped to a virtual memory space in the demand paging window;
  a memory conversion table which informs a Memory Management Unit (MMU) of information about the mapping; and
  a frame buffer list used to manage the frame buffer.

4. The demand paging apparatus of claim 3, wherein the demand paging manager comprises:
  an interface module which initializes the demand paging manager and activates the memory management unit;
  a page cache management module which initializes the frame buffer and the frame buffer list in response to a request from the interface module; and
  a page fault processing module which determines whether the page fault generated by the activated memory management unit was generated in a region of the demand paging window, thereby processing the page fault.

5. The demand paging apparatus of claim 4, wherein the interface module comprises:
  an Application Program Interface (API) which receives a request from the application program to generate the demand paging window, along with information;
  a memory conversion table generation unit which is allocated memory from the demand paging memory pool and generates the memory conversion table for the region of the demand paging window;
  a page fault handler installation unit which registers the page fault processing module in a Central Processing Unit (CPU); and
  a memory management unit control unit which controls the memory management unit to call the registered page fault processing module.

6. The demand paging apparatus of claim 5, wherein the information received from the application program comprises information about a size and an address of a space occupied by the demand paging window, information about a size of the demand paging memory pool, and information about locations of the code and data stored in the nonvolatile storage device.

7. The demand paging apparatus of claim 1, wherein the nonvolatile storage device is a NAND flash memory.

8. The demand paging apparatus of claim 1, wherein the demand paging window is generated by the application program independent of the operating system.

9. A demand paging method for an embedded system, comprising:
  generating a demand paging window in response to a request from an application program stored in a nonvolatile storage device, the demand paging window being a region which is accessed by the application program to generate a page fault for a requested page and causes demand paging to occur, the demand paging window being an address space that is a portion of an entire address space of a memory allocated to the application program, the portion being less than the entire address space;
  initializing a demand paging manager for processing a page fault generated in the demand paging window so as to activate a memory management unit;
  when the page fault has been generated in the demand paging window, calling a page fault processing module registered with a central processing unit (CPU) using the activated memory management unit;
  determining whether the page fault has been generated in the demand paging window using the called page fault processing module; and
  if the page fault has been generated in the demand paging window, processing the page fault via the page fault processing module.

10. The demand paging method of claim 9,
wherein the initializing the demand paging manager comprises:
  receiving a request from the application program to generate of the demand page window, along with information;
  allocating memory by an operating system, and generating a memory conversion table for a region of the demand paging window;
  registering a page fault processing module, which is executed if a page fault interrupt is generated, with the CPU; and
  activating a memory management unit that calls the registered page fault processing module.

11. The demand paging method of claim 10, wherein the information comprises information about a size and an address of a space occupied by the demand paging window, information about a size of memory requested to execute the demand paging, and information about locations of code and data stored in the nonvolatile storage device.

12. The demand paging method of claim 10, wherein the processing the page fault comprises:
  if the page fault was generated in the demand paging window, allocating a frame buffer within a demand paging memory pool to the demand paging manager;
  the page fault processing module reading a page from the nonvolatile storage device using the frame buffer; and
  modifying the memory conversion table according to the read page.

13. The demand paging method of claim 9, wherein the nonvolatile storage device is a NAND flash memory.

14. The demand paging method of claim 9, wherein the demand paging window is generated by the application program independent of the operating system.

15. A computer-readable recording medium storing program code for executing a demand paging method, the method comprising:
  generating a demand paging window in response to a request from an application program stored in a nonvolatile storage device, the demand paging window being a region which is accessed by the application program to generate a page fault for a requested page and causes demand paging to occur, the demand paging window being an address space that is a portion of an entire address space of a memory allocated to the application program, the portion being less than the entire address space;

initializing a demand paging manager for processing a page fault generated in the demand paging window so as to activate a memory management unit;

when the page fault has been generated in the demand paging window, calling a page fault processing module registered with a central processing unit (CPU) using the activated memory management unit;

determining whether the page fault has been generated in the demand paging window using the called page fault processing module; and if the page fault has been generated in the demand paging window, processing the page fault via the page fault processing module.

16. The computer readable medium of claim 15, wherein the initializing the demand paging manager comprises:

receiving a request from the application program to generate of the demand page window, along with information;

allocating memory by an operating system, and generating a memory conversion table for a region of the demand paging window;

registering a page fault processing module, which is executed if a page fault interrupt is generated, with the CPU; and activating a memory management unit that calls the registered page fault processing module.

17. The computer readable medium of claim 16, wherein the information comprises information about a size and an address of a space occupied by the demand paging window, information about a size of memory requested to execute the demand paging, and information about locations of code and data stored in the nonvolatile storage device.

18. The computer readable medium of claim 16, wherein the processing the page fault comprises:

if the page fault was generated in the demand paging window, allocating a frame buffer within a demand paging memory pool to the demand paging manager;

the page fault processing module reading a page from the nonvolatile storage device using the frame buffer; and modifying the memory conversion table according to the read page.

19. The computer readable medium of claim 15, wherein the nonvolatile storage device is a NAND flash memory.

20. The computer readable medium of claim 15, wherein the demand paging window is generated by the application program independent of the operating system.

* * * * *